(12) United States Patent
Zuehlke et al.

(10) Patent No.: US 7,504,122 B2
(45) Date of Patent: Mar. 17, 2009

(54) COATED FOOD PRODUCTS CONTAINING HYDROGENATED INDIGESTIBLE STARCH SYRUP AS A BINDING AGENT

(75) Inventors: Julius W. Zuehlke, Chicago, IL (US); Gordon N. McGrew, Evanston, IL (US); Robert J. Yatka, Orland Park, IL (US); Isao Matsuda, Itami (JP); Yasuo Katta, Kako-gun (JP)

(73) Assignees: Wm. Wrigley Jr. Company, Chicago, IL (US); Matsutani Chemical Industries Co., Ltd., Hyogo-ken (JP)

( * ) Notice: Subject to any disclaimer, the term of this patent is extended or adjusted under 35 U.S.C. 154(b) by 949 days.

(21) Appl. No.: 11/048,879

(22) Filed: Feb. 3, 2005

(65) Prior Publication Data

US 2005/0129806 A1 Jun. 16, 2005

Related U.S. Application Data

(62) Division of application No. 10/074,047, filed on Feb. 14, 2002, now Pat. No. 6,866,876.

(51) Int. Cl.
*A23L 1/0522* (2006.01)

(52) U.S. Cl. .................................................. 426/103
(58) Field of Classification Search ................. 426/103
See application file for complete search history.

(56) References Cited

U.S. PATENT DOCUMENTS

| 4,352,825 | A | 10/1982 | Cherukuri et al. |
| 5,458,892 | A | 10/1995 | Yatka et al. |

FOREIGN PATENT DOCUMENTS

| JP | 07-250626 A | 10/1995 |
| JP | 10-150934 A | 6/1998 |
| JP | 2002-017266 A | 1/2002 |

*Primary Examiner*—Arthur L Corbin
(74) *Attorney, Agent, or Firm*—Sughrue Mion, PLLC

(57) ABSTRACT

An object of the present invention is to provide a coated product with increased stiffness to reduce the chipping after manufacturing and several days of storage, and before wrapping. A coated product such as confectioneries such as chewing gum, medicines and medicinal tablets wherein the product is coated with a coating composition comprising hydrogenated indigestible starch syrup as a binding agent.

5 Claims, 3 Drawing Sheets

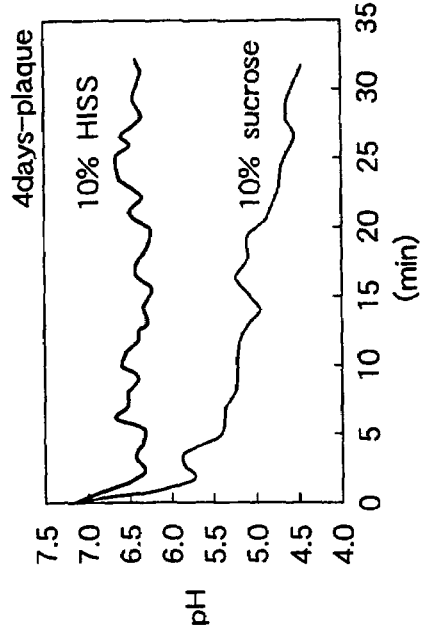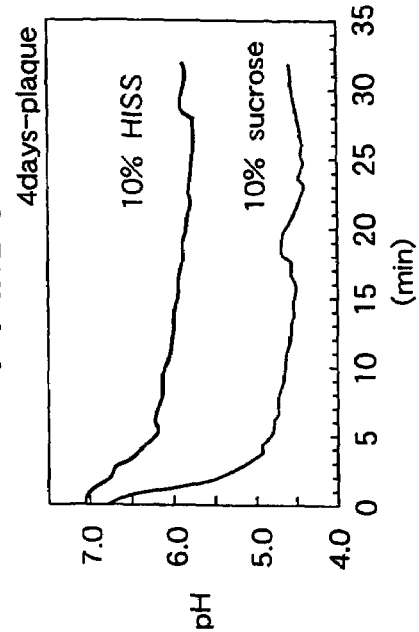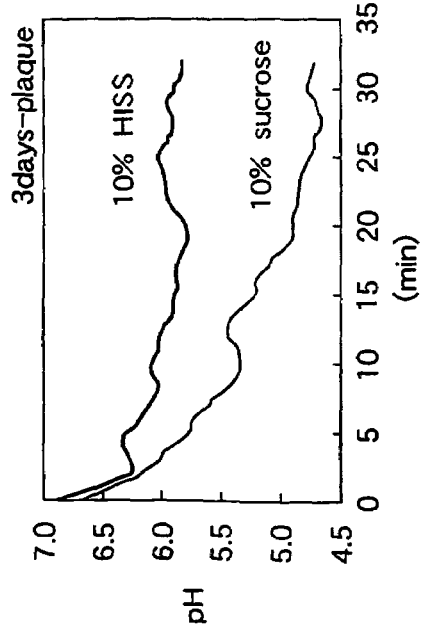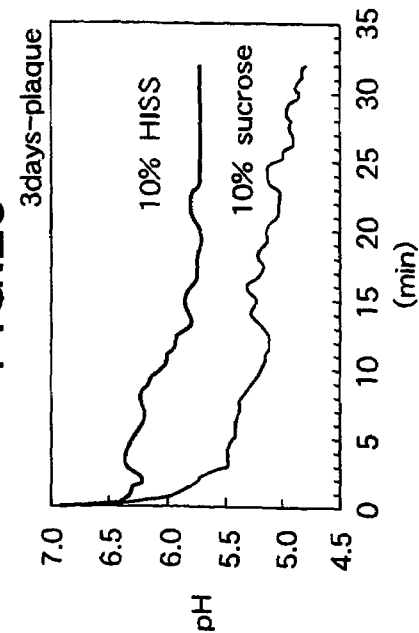
FIG.2a-d pH-telemetric Results of HISS and Sucrose Structure of Zig-Zag Tester

1

COATED FOOD PRODUCTS CONTAINING HYDROGENATED INDIGESTIBLE STARCH SYRUP AS A BINDING AGENT

CROSS REFERENCE TO RELATED APPLICATION

This is a Divisional Application of prior application Ser. No. 10/074,047 filed Feb. 14, 2002 now U.S. Pat. No. 6,866,876 the disclosure of which is incorporated herein by reference.

BACKGROUND OF THE INVENTION

1. Field of the Invention

This invention relates to a coated product. More particularly, it relates to confectioneries such as chewing gum, pharmaceuticals, medicinal tablets and the like, which contain hydrogenated indigestible starch syrup as a binding agent in the coating composition.

2. Prior Art

In recent years, effort have been devoted to replace sugar and sugar syrups normally found in coated products with other carbohydrates and noncarbohydrates. Non-sugar or sugarless coated product, which is growing in popularity, uses sugar alcohols or polyols to replace sugar and sugar syrups. The most popular polyols are sorbitol, mannitol, xylitol, and maltitol. New polyols are being developed using new technology to replace these polyols. New polyols have various unique properties, which can improve the taste, texture and shelf life properties of coated product for consumers. The sugarless polyols have the advantage of not contributing to dental caries of consumers, as well as being able to be consumed by diabetics.

PCT publication Nos. WO 92/009208 and WO 93/005663, and U.S. Pat. No. 5,458,892, disclose the use of indigestible dextrin in gum coatings with polyols.

PCT publication Nos. WO 94/016574, WO 95/007622, WO 95/007625, WO 95/008924, WO 95/008925, and WO 951008926 disclose the use of various polyols that can be used to coat chewing gum. In addition, these polyols are known as non-cariogenic.

Japanese Patent A-2-207745 discloses sugar-coating material which contains one or more of pre-gelatinized starch or dextrin and a sugar alcohol.

Japanese Patent A-62-91501 discloses an indigestible polysaccharide obtained by heating hydrogenated starch hydrolysate in the presence of an acid catalyst under anhydrous condition.

U.S. Pat. Nos. 5,436,329, 5,493,014, EP No. 0,561,088, EP No. 0,561,089, and EP No. 0,561,090 disclose hypocariogenic hydrogenated saccharide compositions which contain hydrogenated monosaccharides, hydrogenated disaccharides, and polysaccharides non-hydrolysable by amyloglucosidase, obtainable by saccharifying enzyme hydrolysis of dextrin and hydrogenating the hydrolysate.

EP No. 0,368,451 and U.S. Pat. No. 5,620,873 disclose processes for preparing indigestible dextrin and hydrogenation of the obtained dextrin.

Japanese Patent A-10-150934 discloses hydrogenated indigestible starch syrup and food containing the same. The syrup is obtained by hydrolysing pyrodextrin by a combination of alpha-amylase, debranching enzyme, and beta-amylase, then hydrogenating the syrup.

Sugarless coated products, coated with various sugarless polyols have been developed over the years. One polyol that has an advantage over other polyols for use as a coating is maltitol. It can be easily added in conventional panning operations to give a quality, crunchy, hard shell coating. However, one drawback is that the maltitol coating is too hard and brittle, thus causing the coating to chip at the corners of the gum pellet. This usually occurs in the manufacturing facility just after manufacturing and several days of storage, and before gum pellets are wrapped. The addition of natural gums, such as gum Arabic, to the coating reduces chipping slightly.

SUMMARY OF THE INVENTION

Accordingly, an object of the present invention is to develop a coated product with increased stiffness to reduce the chipping after manufacturing and several days of storage, and before wrapping.

The inventors of the present invention have found out that the use of hydrogenated indigestible starch syrup showed a significant reduction of chipped pellets. The special hydrogenated indigestible starch syrup (hereinafter referred to as HISS) available from Matsutani Chemical Industries Co. Ltd., Japan under the trade names of MIXOL and H-FIBER, can be used as a coating additive in the coating of various coated products. The inventors have completed the present invention based on this finding.

HISS contains dietary fiber, does not cause dental caries, and has moderate sweetness and viscosity. Moreover, HISS has an ability to improve the above-mentioned drawback of polyols when HISS is mixed together with polyols or natural gums.

The coating may be a sugar coating or a sugarless coating made with sorbitol, maltitol, xylitol, isomalt (hydrogenated isomaltulose), lactitol, mannitol, or erythritol. HISS is used as a binder in the coating and, because it is a hydrogenated starch syrup or polyol, it is preferred to use in sugarless coatings. It has been found that HISS is most effective as a binder in maltitol coatings and reduces chipping of the coating during the production and wrapping of the coated product.

BRIEF DESCRIPTION OF THE DRAWINGS

FIGS. 2a-2d show the interdental plaque-pH test results of HISS and sucrose. The horizontal axis shows the time after mouth rinsing with the 10% solution and the vertical axis shows the interdental pH.

DETAILED DESCRIPTIONS OF THE INVENTION AND PREFERRED EMBODIMENTS

Figure 1:
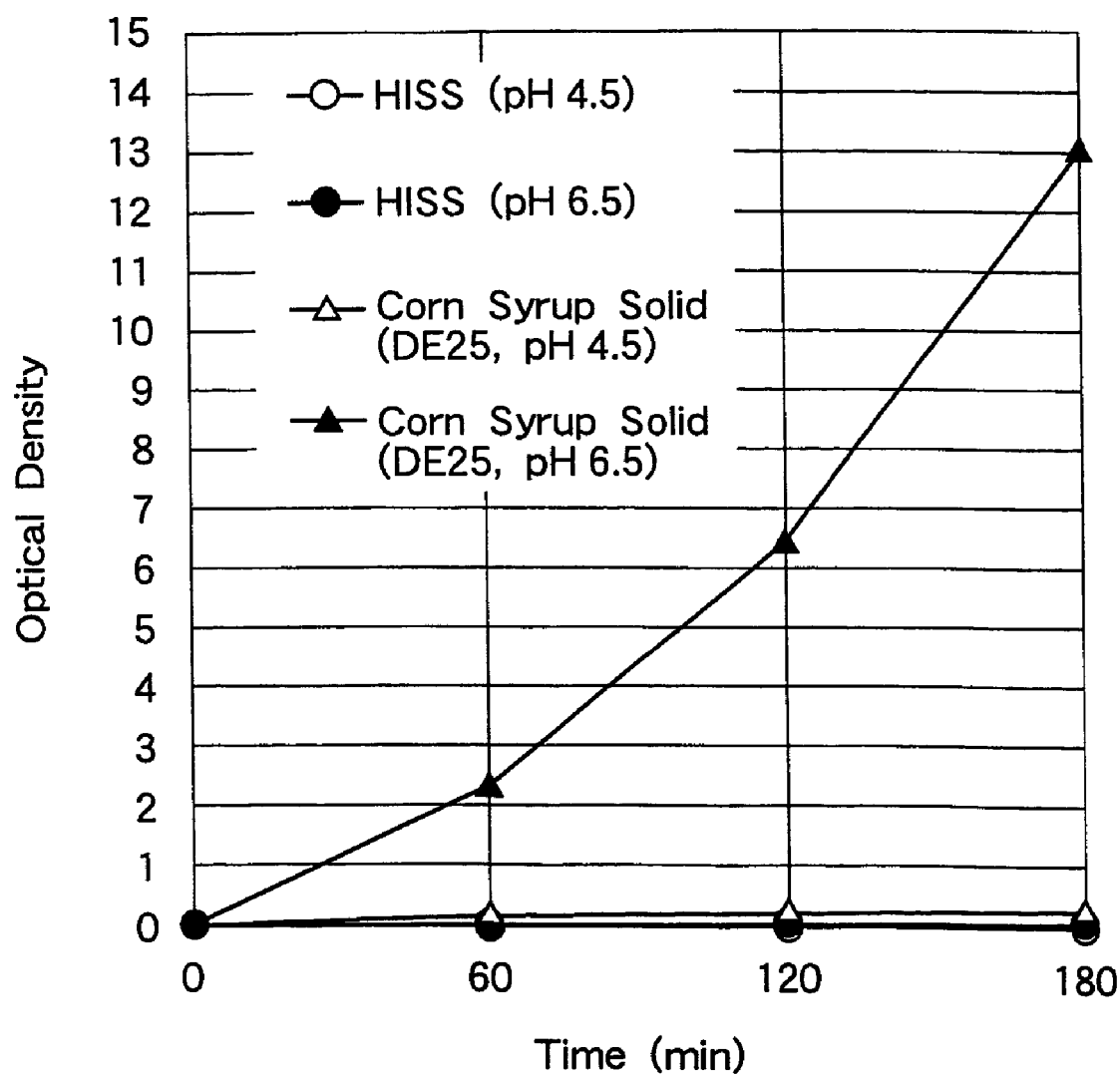
FIG. 1 shows the browning reaction of HISS and of corn syrup solids heated in a boiling water bath. The horizontal axis shows the heating time and the vertical axis shows the color of the solution.

All percentages herein are weight percentages unless otherwise specified. The present invention may be applied to a variety of coated foods and medicines, such as confectioneries and medicines coated with sugar coating or sugarless coating.

Different compositions that are typically used in coated products. Taking chewing gum products as an example of the present invention, the invention may be applied to a variety of different compositions that are typically used in chewing gum compositions. In general, a chewing gum composition typically contains a chewable gum base component, which is essentially free of water and is water-insoluble, a water-soluble bulking component, and flavors which are typically water-insoluble. The water-soluble component dissipates the flavor over a period of time during chewing. The gum base component is retained in the mouth throughout the chewing.

The insoluble gum base generally comprises gum substances, solvents for gum substances, resins, plasticizers, waxes, emulsifiers, and inorganic fillers. Plastic polymers such as polyvinyl acetate, which can be a plasticizer, are also included. Other plastic polymers that may be used include polyvinyl laurate, polyvinyl alcohol, and polyvinyl pyrrolidone.

Gum substances may include polyisobutylene, butyl rubber, isobutylene-isoprene copolymer, and styrene butadiene rubber, as well as natural latexes such as chicle. Resins such as terpene resins can be used as solvents for gum substances. Plasticizers, sometimes referred to as softeners, are typically animal fats and oils, including tallow, hydrogenated vegetable oils, and cocoa butter. Commonly employed waxes include paraffin, microcrystalline waxes, and natural waxes such as beeswax and carnauba may be considered bodying agents or texture modifiers.

The gum base typically also includes a filler component. The filler component may be calcium carbonate, magnesium carbonate, talc, dicalcium phosphate or the like. The filler may constitute between approximately 5% to about 50% of the gum base.

Emulsifiers, which sometimes also have plasticizing properties, include glycerol monostearate, lecithin, and glycerol triacetate. Further, gum bases may also contain optional ingredients such as antioxidants, colors, and flavors.

The insoluble gum base may constitute between approximately 5% to about 95% of the gum. Typically, the insoluble gum base may comprise between approximately 10% and 50% of the gum, or from approximately 20% to about 40% of the gum. The water-soluble component of the chewing gum may further comprise softeners, sweeteners, flavoring agents, and combinations thereof The sweeteners often fulfill the role of bulking agents in the gum. The bulking agents typically comprise approximately 5% to about 95% of the gum composition. As the bulking agents, a sweetener such as sorbitol and maltitol can be used.

Softeners may be added to the chewing gum in order to optimize the chewability and mouth feel of the gum. Softeners, also known in the art as plasticizers or plasticizing agents, generally constitute between approximately 0.5% to about 15% of the chewing gum. Softeners contemplated by the present invention include, for example, lecithin. Further, aqueous sweetener solutions such as those containing sorbitol, hydrogenated starch hydrolysate, corn syrup, and combinations thereof may be used as softeners and binding agents in the gum.

The gum formulation of the present invention is preferably a sugar-free gum formulation. However, sugar-gum formulations also may be manufactured pursuant to the present invention. Sugar sweeteners generally include saccharide-containing components commonly known in the chewing gum art which comprise, but are not limited to, sucrose, fructose, galactose, corn syrup solids and the like, alone or mi any combination. Generally, sugarless sweeteners include components with sweetening characteristics, but which are devoid of the commonly known sugars. Such sugarless sweeteners are sorbitol, mannitol, xylitol, isomalt, maltitol, erythritol, and the like, alone or in any combination.

Depending on the particular sweetness release profile and shelf stability required, coated or uncoated high intensity sweeteners may be used in the chewing gum composition. High intensity sweeteners or artificial sweeteners, such as aspartame, saccharin, thaumatin, alitame, saccharin salts, sucralose, or acesulfame-K may be used at levels from approximately 0.0001% to about 5.0%. High intensity sweeteners may be encapsulated to give improved stability and modified release characteristics. Encapsulated aspartame is a high intensity sweetener with improved stability and release characteristics, as compared to free aspartame. Free aspartame can also be added, and a combination of some free and encapsulated aspartame can be used.

Combinations of sugar and sugarless sweeteners may be used in the chewing gum.

Additionally, the softener may also provide additional sweetness such as with aqueous sugar or alditol solutions.

Flavors may be present in the chewing gum in an amount within the range from approximately 0.1% to about 10% and typically from approximately 0.5% to about 3.0% of the gum. Flavors contemplated by the present invention include any liquid flavoring that is of food acceptable quality. The flavor may comprise essential oils, synthetic flavors, or mixtures thereof, including but not limited to, oils derived from plants and fruits such as citrus oils, fruit essences, peppermint oil, spearmint oil, clove oil, oil of wintergreen, anise and the like. Artificial flavoring components are also contemplated by the present invention. Those of ordinary skill in the art will recognize that natural and artificial flavors may be combined in any sensorial acceptable blend. All such flavors and blends are contemplated by the present invention.

Optional ingredients such as colors, emulsifiers, and pharmaceutical agents may also be added as separate components of the chewing gum composition, or added as part of the gum base.

A method of manufacturing chewing gum according to the present invention involves sequentially adding the various chewing gum ingredients to any commercially available mixer known in the art. After the ingredients have been thoroughly mixed, the gum mass is discharged from the mixer and shaped into the desired form such as by rolling into sheets, extruding into chunks, or casting into pellets.

Generally, the ingredients are mixed by first melting the gum base and adding it to the running mixer. The base may also be melted in the mixer itself. Colors or emulsifiers may also be added at this time. A softener such as glycerin may be added to the mixer at this time, along with syrup and a portion of the bulking agent. Further portions of the bulking agent are then added to the mixer. Flavoring agents are typically added with the final portion of the bulking agent. Other optional ingredients are added in the batch in a typical fashion, well known to those of ordinary skill in the art.

The entire mixing procedure typically takes from five to fifteen minutes, but longer mixing times may sometimes be required. Those skilled in the art will recognize that many variations of the above-described procedure may be followed.

Coatings for chewing gum generally consist of sugars or polyols. Sugars used for coating are sucrose, dextrose, isomaltulose (palatinose), maltose, and galactose. For sugarless gum, many of the alditols or polyols can be used for coating such as sorbitol, mannitol, maltitol, xylitol, isomalt, erythritol, and lactitol. Concentrated syrups are prepared from these materials and applied as a gum coating.

The coating may also contain ingredients such as flavoring agents, artificial sweeteners and dispersing agents, coloring agents, film formers and binding agents. Flavoring agents contemplated by the present invention include those commonly known in the art such as essential oils, synthetic flavors, or mixtures thereof, including but are not limited to, oils derived from plants and fruits such as citrus oils, fruit essences, peppermint oil, spearmint oil, other mint oils, clove oil, oil of wintergreen, anise and the like. The flavoring agents may also be added to the coating syrup in an amount such that the coating will contain from approximately 0.2% to about 3.0% flavoring agent, and typically constitute from approximately 0.7% to about 2.0% flavoring agent.

Artificial sweeteners, particularly high intensity sweeteners, contemplated for use in the coating include, but are not limited to, synthetic substances, saccharin, thaumatin, alitame, saccharin salts, aspartame, sucralose, and acesulfame K. The artificial sweetener may be added to the coating syrup in an amount such that coating will contain from approximately 0.01% to about 1.0% and typically from approximately 0.10% to about 0.5%, artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is the preferred dispersing agent of the present invention. The dispersing agent may be added to the coating syrup in an amount such that the coating syrup in an amount such that the coating will contain approximately 0.1% to about 1.0%, and typically from approximately 0.3% to about 0.6% of the agent.

Coloring agents may be added directly to the coating syrup in dye or lake form. Coloring agents contemplated by the present invention include food quality dyes. Film formers may be added to the coating syrup include methylcellulose, carboxymethyl cellulose, ethyl cellulose, hydroxyethyl cellulose, and the like or combinations thereof.

Binding agents may be added either as an initial coating on the chewing gum center or may be added directly to the coating syrup. A binding agent contemplated for the present invention is the HISS. Other binding agents may also be used which include gum Arabic, gum talha, gelatin, vegetable gums, and the like. The binding agents, when added to the coating syrup, are typically added at a level of between approximately 0.5% to about 15%.

The coating is initially present as a liquid syrup which contains from about 30% to about 80% of the coating ingredients previously described herein, and from about 20% to about 70% of a solvent, specifically water. In general, the coating process is carried out in a rotating pan. Sugar or sugarless gum center tablets to be coated or panned are placed into the rotating pan to form a moving mass.

The material or syrup, which will eventually form the coating, is applied or distributed over the gum centers tablets. Flavoring agents may be added before, during, and after applying the syrup to the gum centers. Once the coating has dried to form a hard surface, additional syrup additions can be made to produce a plurality of coatings or multiple layers of hard coating.

In a hard coating panning procedure, syrup is added to the gum center tablets at a temperature range of from about 100° F. (38° C.) to about 240° F. (116° C.). Preferably, the syrup temperature is from about 130° F. (54° C.) to about 200° F. (93° C.) throughout the coating process in order to prevent the polyol or sugar in the syrup from crystallizing. The syrup may be mixed with, sprayed upon, poured over, or added to the gum center tablets in any way known to those skilled in the art.

In general, to obtain a plurality of layers, single coats of syrup applied, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. Typically, about 30 to about 60 coats are applied. In any event, the present invention contemplates applying an amount of syrup sufficient to yield a coated chewing gum or comestible containing about 10% to about 65% coating. Preferably, the final product will contain from about 20% to about 50% coating.

Those skilled in the art will recognize that in order to obtain a plurality of coated layers, a plurality of premeasured aliquots of coating syrup may be applied to the gum center tablets. It is contemplated, however, that the volume of aliquots of syrup applied to the gum center tablets may vary throughout the coating procedure.

Once a coating of syrup is applied to the gum center tablets, the present invention contemplates drying the wet syrup in an inert medium, such as air. Preferably, forced drying air contacts the wet syrup coating in a temperature range of from about 70° F. (21° C.) to about 115° F. (46° C.). The invention also contemplates that the drying air possesses a relative humidity of less than about 15%. The drying air may be passed over and admixed with the syrup coated gum centers in any way commonly known in the art. Preferably, the drying air is blown over and around or through the bed of the syrup coated gum centers at a flow rate, for large-scale operations, of about 2800 cubic feet (80 cubic meters) per minute. If lower quantities of material are being processed, or if smaller equipment is used, lower flow rates may be used.

The concentrated coating syrup is applied to the gum cores as a hot liquid, the sugar or polyol allowed to crystallize, and the coating then dried with warm, dry air. This is repeated in about 30 to 60 applications to obtain a hard shell coated product having an increased weight gain of about 20 to about 50%. A flavor is applied with one, two, three, or even four or more of these coating applications. Each time flavor is added, several non-flavored coatings are applied to cover the flavor before the next flavor coat is applied. This reduces volatilization of the flavor during the coating process.

The present invention uses the material prepared by an improved method found in JP-A-10-150934 titled "Hardly Digestible Reduced Starch Syrup and Foods Utilizing It". This is hydrogenated indigestible syrup [HISS], since it was prepared from an indigestible starch syrup. This material is available from Matsutani Chemical Industries, Co. Ltd. under the trade names of "H-Fiber" or "MIXOL". However, the hydrogenated indigestible starch syrup is not currently food approved in the US or any countries, except Japan. Matsutani is seeking approval for use in food in other countries.

As disclosed earlier, the HISS is added to the coating syrup in the present invention to act as a binder for the main coating component usually a sugar or polyol. Preferably, the coating will be a polyol, such as maltitol, sorbitol, xylitol, isomalt, lactitol, and erythritol, to obtain a sugarless product. Like gum Arabic or gum talha, HISS binds the polyol to the gum center as well as increases the hardness of the coating. A binder is required for coatings with these polyols to give the coating more crunch during chewing as well as to protect the coating from damage during processing and handling.

Since many pellet products are pillow shaped, edges and corners are subject to deterioration during the coating process, and a binder is added to help cover and hold the coating on the edges and corners. This is especially true for coatings made with xylitol and erythritol. It has been found that coatings made with maltitol form a hard, crunchy shell during coating, but the shell becomes too friable after coating and has a tendency to chip at the corners during the handling of the product several hours after it has been made. The addition of a binder such as gum Arabic reduces corner chipping, but not to a sufficient degree. It has been found that when HISS is used as the binder for a maltitol coating, the amount of corner chipping is significantly reduced.

Hereinafter, examples still be described to explain the present invention in detail.

EXPERIMENTAL EXAMPLES

Determination of Sugar Composition

10 μl of 5% solution was analyzed by high-performance liquid chromatography under the following condition.

| Column | Mitsubishi MCI GEL CK04SS |
|---|---|
| Detector | differential refractometer |
| Column temperature | 176° F. (80° C.) |
| Flow rate | 0.3 ml/min. |
| Eluent | water |

DP1, DP2, and DP3 in the following tables correspond to sorbitol, maltitol, and maltotritol, respectively.

Quantitative Determination of Dietary Fiber

The content of dietary fiber was quantitatively determined according to an analytical method defined in "Eishin" No. 47 by the Ministry of Health and Welfare of Japan, which defines analytical methods for nutrients, and was notified on May 23, 1996. The method using high-performance liquid chromatography is applicable to foods containing low-molecular-weight water-soluble dietary fiber that is reported to be difficult to determine by the Prosky's method (Prosky, L et al, J. Assoc. Off. Anal. Chem., 68, (2), 399, 1985) only.

1) At first, according to the Prosky's method, a sample was digested with heat-stable alpha-amylase, protease and subsequently with amyloglucosidase and then ethanol was added to the reaction mixture to precipitate and the precipitate was collected by filtration. The residue was weighed after dried to determine the content of dietary fiber A (%).
2) Then, the filtrate was evaporated and filled up to 100 ml to obtain enzyme-treated solution containing low-molecular-weight water-soluble dietary fiber. The solution was passed through ion-exchange resins, which was eluted with distilled water to obtain 200 ml of eluate. The eluate was concentrated to 5%, and then filtered through a membrane filter with pore size of 0.45 nm to obtain a sample solution.
3) The sample solution was applied to high-performance liquid chromatography under the following condition to obtain a high-performance liquid chromatogram. Areas corresponding to fractions of glucose and dietary fiber, or fractions of internal standard material and dietary fiber were determined.

| Column temperature: | 176-185° F. (80-85° C.) |
|---|---|
| Mobile phase: | water |
| Flow rate: | 0.3 ml/min |
| Injection amount: | 20 μl |

4) The content of glucose in the sample solution obtained in 2) was determined using pyranose oxidase, and the glucose was used as the internal standard material.
5) Calculation

[Low-molecular-weight water-soluble dietary fiber (mg) ($B$)]=[peak area of dietary fiber]/[peak area of glucose]×[weight of glucose]

[Low-molecular-weight water-soluble dietary fiber in dried and defatted sample (%) ($D$)]=[weight of dietary fiber B (mg)]/[weight of collected sample (mg)]×100

[Low-molecular-weight water-soluble dietary fiber in crude sample (%) ($E$)]=$D$×{1-([decreased amount after drying (%)]+[decreased amount after defatting (%)])/100}

[Total dietary fiber in crude sample (%)]=[amount of dietary fiber obtained by the Prosky's method ($A$) (%)]+[amount of low-molecular-weight water-soluble dietary fiber ($E$) (%)]

Determination of Concentration

Concentration was determined by hand refractometer (manufactured by ATAGO) and Brix degree was defined as concentration in percent.

Experimental Example 1

A 1% solution of hydrochloric acid was sprayed using pressurized air to commercially available cornstarch placed in a ribbon mixer, in an amount of 400 ppm based on the weight of the cornstarch, while rotating the mixer. Then the mixture was passed through a disintegrator to obtain a uniform mixture, which was further treated in the ribbon mixer for 4 hours. The mixture was pre-dried in a flash dryer to a moisture content of about 4% and then charged into a roaster and dry-heated at 302° F. (150° C.) for 20 minutes to obtain pyrodextrin.

The pyrodextrin was dissolved in water to obtain solution of 35% concentration, and 0.2% of Termamyl 60L (trade name: bacterial alpha-amylase preparation produced by Novo Nordisk Bioindustry Ltd., Japan) was added and the mixture was hydrolyzed at 194° F. (90° C.) for 10 minutes. Then, the mixture was heat-treated in the pressurized container at 266° F. (130° C.) for 20 minutes. The hydrolysate was diluted to 30% and adjusted to pH 5.5. 0.2% of Fungamyl 900L (trade name: fungal alpha-amylase preparation produced by Novo Nordisk Bioindustry Ltd., Japan) and 0.215% of pullulanase/Amano (trade name: debranching enzyme preparation produced by Amano Enzyme Inc., Japan) were added to the hydrolysate and hydrolyzed at 131° F. (55° C.) for 15 hours. The hydrolysate was decolorized with activated carbon and filtered. After deionized and decolorized with ion exchange resin, the solution was concentrated under vacuum to obtain an indigestible starch hydrolysate of which the concentration is 65% and the content of dietary fiber is 44.0% based on the solid.

Next, 1 kg of thus obtained indigestible starch hydrolysate was placed in a 2-liter reaction vessel for hydrogenation and 20 g of Raney nickel R239 was added as a catalyst. Then the vessel was filled with hydrogen gas to a pressure of 100 Kg/cm$^2$ and hydrogenation was conducted at 400 to 600 rpm with stirring at 266° F. (130° C.) for 3 hours. The hydrogenated solution was filtered to separate the catalyst, followed by decolorization with activated carbon and deionizing and decolorizing through ion exchange resin. Thus obtained solution was concentrated to 70% to obtain approximately 710 g of HISS. The analytical data of the HISS was shown in Table 1.

TABLE 1

| Degree of polymerization | Content of each component (%) |
| --- | --- |
| DP1 | 9.6 |
| DP2 | 29.6 |
| DP3 | 3.1 |
| DP4 | 6.2 |
| DP5 | 4.8 |
| DP6 | 4.1 |
| DP7 and higher | 42.6 |
| Content of dietary fiber | 44.0 |

Physical Property

Method of Determination

Sweetness, viscosity, stability, film forming ability, and tendency to cause dental caries of HISS were determined as compared with sucrose, sorbitol, maltitol, and polydextrose. The method of determination and results were shown below.

1. Determination of Sweetness

The sucrose solution of which sweetness corresponds to that of 30% of a sample solution was determined by sensory test and the sweetness of the sample was calculated by the following equation.

Sweetness=[the corresponding concentration of sucrose solution (%)]/30(%)×100

2. Determination of Viscosity

Sample was diluted to the concentration of 50% and viscosity at 68° F. (20° C.), 104° F. (40° C.), and 140° F. (60° C.) was measured using Brookfield viscometer.

3. Determination of Color

Light absorbency of 10% solution of sample at 420 nm and at 720 nm was measured with spectrophotometer UV-160 (manufactured by Shimadzu Corporation) using a cell of 10 cm. The difference between the absorbency at 420 nm and that at 720 nm was defined as the color.

Results

1. Sweetness

The results of sensory test of sweetness were shown in Table 2.

TABLE 2

| Sucrose | 100 |
| --- | --- |
| Sorbitol | 65 |
| HISS | 40 |

2. Viscosity

Determined viscosity was shown in Table 3.

TABLE 3

(Unit: cps)

| | 68° F. (20° C.) | 104° F. 40° C. | 140° F. 60° C.) |
| --- | --- | --- | --- |
| HISS | 25 | 13 | 8 |
| Sucrose | 16 | 7 | 4 |
| Maltitol | 20 | 11 | 7 |
| Polydextrose | 21 | 7 | 12 |

3. Tests for Stability

1) Browning

Using buffer solutions (containing 1% of glycine) of pH 4.5 and 6.5, coloring of HISS and corn syrup solid (DE 25) were investigated. A 10% concentration of solution was prepared with each buffer, and heated in a boiling water bath for 3 hours, and samples were taken up from the solution at time intervals to measure the degree of coloring. The results were shown in FIG. 1. FIG. 1 indicates that HISS shows almost no browning.

2) Heat Stability Under Acidic Condition 0.25% of citric acid and 0.05% of ascorbic acid were added to a 10% solution of HISS. After heating the mixture at 212° F. (100° C.) for 1 hour, the color and sugar composition of the sample was determined to investigate the stability of the samples. The results were shown in Table 4.

TABLE 4

| | Before heating | After heating |
| --- | --- | --- |
| Degree of coloring | 0.010 | 0.050 |
| Sugar composition | | |
| DP1 | 9.6 | 9.8 |
| DP2 | 29.6 | 29.8 |
| DP3 | 3.1 | 3.1 |
| DP4 | 6.2 | 6.2 |
| DP5 | 4.8 | 4.5 |
| DP6 | 4.1 | 4.0 |
| DP7 and higher | 42.6 | 42.6 |

As seen from Table 4, the color of HISS slightly increased and the decomposition of sugars was not observed.

3) Stability After Boiling Down Under Acidic Condition

The HISS was concentrated to 75%. Then 1.0% of citric acid was added to 100 g of the concentrate, and heated up to 320° F. (160° C.) on a 600-W hot plate to boil down. The concentrate was poured into a mold and allowed to cool to prepare a candy. The color and sugar composition were determined to investigate the stability after boiling down under acidic condition. The results were shown in Table 5.

TABLE 5

| | Before heating | After heating |
| --- | --- | --- |
| Color | 0.010 | 0.015 |
| Sugar composition | | |
| DP1 | 9.6 | 10.1 |
| DP2 | 29.6 | 29.2 |
| DP3 | 3.1 | 3.5 |
| DP4 | 6.2 | 6.0 |
| DP5 | 4.8 | 4.8 |
| DP6 | 4. | 4.2 |
| DP7 and higher | 42.6 | 42.2 |

As seen from Table 5, color and sugar composition did not change after heating and the result suggests that HISS is remarkably stable.

4. Film Forming Ability

Films were prepared according to the following procedure and their film forming ability was compared. 60 g of xylitol and 10 g (dry solid) of film formers shown in Table 6 were dissolved in calculated amount of water to form 100 g of solutions. Then, viscosity of the solution was measured at 86° F. (30° C.) by Brookfield viscometer.

TABLE 6

| Film Former | Viscosity | Time required for forming film |
| --- | --- | --- |
| Gum Arabic | 243 cps | 30 sec |
| HISS | 58 cps | 480 sec |
| Maltodextrin (DE 8) | 65 cps | 300 sec |
| Gum Arabic + HISS (1:1) | 150 cps | 60 sec |

The solution was rubbed and spread onto a plastic Petri dish until a film was formed, and time required for forming the film was measured. Then, the Petri dishes were weighed periodically until weights become constant, and moisture content was calculated. Flexibility of the films was evaluated by twisting and bending the Petri dishes. The results were shown in Table 7 and 8.

TABLE 7

| | Time (hr) | | | | | |
| --- | --- | --- | --- | --- | --- | --- |
| | 0* | 3 | 21 | 24 | 26 | 42 |
| Film Former | | | Moisture (%) | | | |
| Gum Arabic | 30.6 | 6.07 | 2.36 | 2.36 | 2.36 | 2.35 |
| HISS | 21.2 | 6.06 | 2.20 | 2.20 | 2.04 | 1.94 |
| Maltodextrin (DE 8) | 24.6 | 4.09 | 1.32 | 1.29 | 1.29 | 1.12 |
| Gum Arabic + HISS (1:1) | 30.6 | 10.1 | 2.90 | 2.64 | 2.58 | 2.41 |

*The time when film was formed was recorded as 0 hr.

TABLE 8

| Film Former | Flexibility | Surface of the film |
| --- | --- | --- |
| Gum Arabic | Brittle | Rough/Large crystals of xylitol observed |
| HISS | Elastic | Smooth/No crystallization |
| Maltodextrin | Brittle | Smooth/No crystallization |
| Gum Arabic + HISS (1:1) | Elastic | Rough/Tiny crystals of xylitol observed |

From the results shown in Table 8, the films prepared from HISS alone or in combination with Gum Arabic have almost the same qualities as compared with films prepared from Gum Arabic alone.

5. Tendency to Cause Dental Caries

Plaque pH Test (In-Vivo)

Four persons in good general health served as tested subjects. All of them had previously participated in the similar studies and their responses to a certain control procedures were well known.

For interdental plaque-pH telemetry each subject had a mandibular telemetric prosthesis incorporating a miniaturized hydrogen-ion-sensitive field effect transistor electrode (ISFET pH-electrode, PH-6010; Nihon Koden, Tokyo, Japan) at the interproximal area that was created with human enamel in the missing tooth area of the prosthesis. The test prostheses with clean pH-electrodes were inserted. The subjects were asked not to alter their eating habits, and not to brush the areas which the electrodes were inserted. The subjects were instructed to come to the laboratory the 3rd or 4th day after the test without eating or drinking except water for 2 hours before the trial.

At the beginning of the experiment, the wires from the electrode were connected to a meter (ISFET mV/pH Meter, Shindengen, Saitama, Japan) which was connected to a chart recorder (LR 4200, Tosoh Corporation, Tokyo, Japan). A reference electrode (PH-8050: Nihon Kohden, Tokyo, Japan) was attached to the forearm.

The pH-recording were performed according to the method described by Igarashi et al. (Arch. Oral Biol., 1980; 26: 203-207) and Yamada et al. (J. Dent. Res., 1980; 59: 2157-5162). Sucrose rinses (10%) were used as positive controls. The pH-telemetric results are presented in FIGS. 2-a to 2-d. The pH-values registered following the chewing of neutral paraffin coincide with those found in earlier tests with the same volunteers and plaque ages. They suggest physiological oral conditions in the test subjects. The pH decreases occurring subsequently to the 10% sucrose rinses used as positive controls gave evidence of an accurate functioning of pH-telemetric equipment and of plaque metabolism.

The results in FIGS. 2-a to 2-d clearly showed that there was no critical decrease in the pH of interdental plaque due to bacterial fermentation of carbohydrates during and for 30 minutes after 2-minute rinse of HISS solution (10%). After the 10% sucrose rinse, however plaque-pH fell well below 5.0 due to the glycolytic products of bacterial acids.

A sample is "non-cariogenic", if it can be shown under in vivo-conditions in humans, that interdental plaque does not decrease below pH 5.7 by bacterial of fermentable substrates during a rinse of 10% solution of the product and for up to 30 minutes subsequently.

This test/result shows that the tested HISS fulfills these requirements.

EXAMPLES

Methods of Measurement

Finished coated product is tested for chipping after 24 hours, 48 hours, or 72 hours after manufacture by, one of two chipping test methods. These are:

Bucket test Prepare 100 finished pellets by selecting pellets with no bad corners, banana shapes, or any pellets stuck together. At a height of about 40 inches (1 meter) pour the pellets into an empty, dry stainless steel 3-gallon bucket. Remove the pellets from the bucket counting the number of chipped corners on the pellets. Each pellet may have all 4 corners chipped, thus giving a maximum of 400 chipped corners per 100 pellets.

Figure 3:
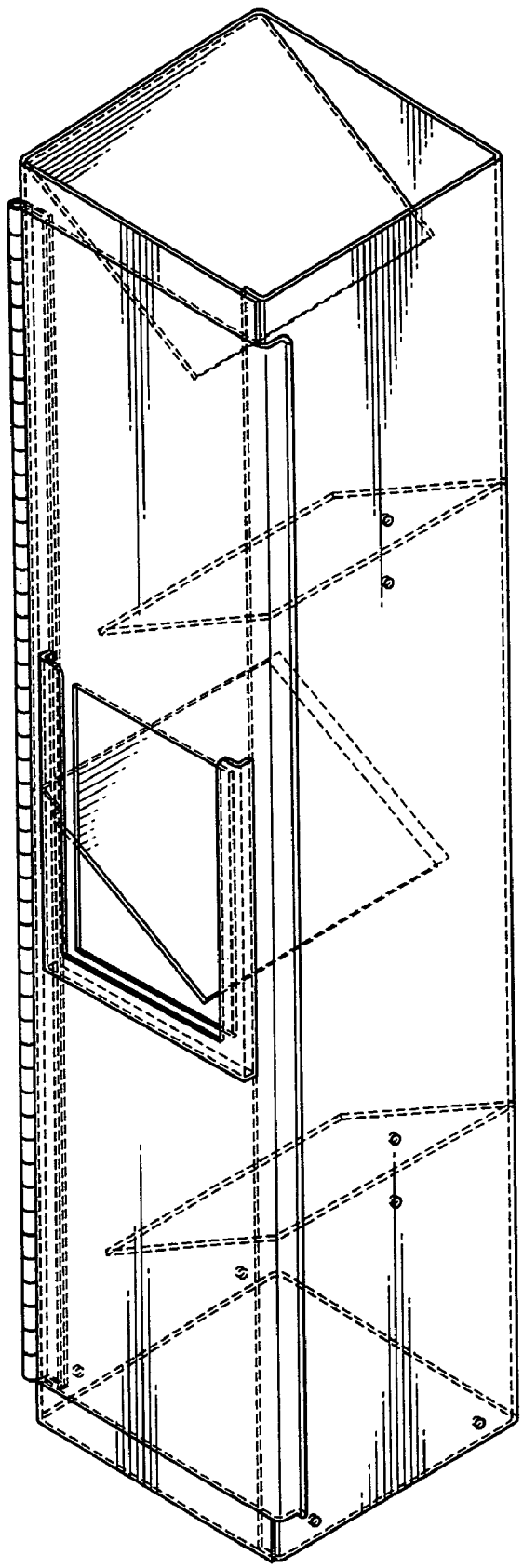
FIG. 3 shows a piece of test equipment used to test corner chipping.

Zig-Zag method: Prepare 100 finished pellets as above. Prepare the zig-zag tester by placing it on a stable surface and close the bottom metal plate. The zig-zag tester is a 1-meter high stainless steel metal box that is open at the top and closed at the bottom with a removable bottom plate. It is square (6 inches by 6 inches (15 cm by 15 cm)) with 4 metal plates attached to the sides at a 30 degree angle from horizontal to allow pellets to hit the zig-zag plates all the way to the bottom plate. The structure of the zig-zag tester was shown in FIG. 3. The test pellets are poured into the tester and removed by removing the bottom plate. The number of chipped corners on the pellets is counted as above.

The following inventive and comparative examples are provided by way of explanation and illustration and not limitation. The following center formula is used in all of the examples and the coating formula below is a typical coating formula used for comparison:

TABLE 9

| Gum Center Formula, (% (by weight)) | |
|---|---|
| Gum Base | 33.0 |
| Calcium carbonate | 13.0 |
| Sorbitol | 46.4 |
| Glycerin | 4.0 |
| Peppermint flavor | 2.0 |
| Menthol | 0.4 |
| High intensity sweetener | 0.1 |
| Encapsulated high intensity sweetener | 0.7 |
| Lecithin | 0.4 |
| | 100.0 |
| Coating Formula A, % (by weight) | |
| Maltitol | 77.5 |
| Maltitol powder | 12.1 |
| Gum Talha | 7.9 |
| Flavor | 1.3 |
| Titanium Dioxide | 0.6 |
| Sweetener | 0.3 |
| Talc | 0.2 |
| Carnauba wax | 0.1 |
| | 100.0 |

Maltitol is prepared in water as syrup and maltitol powder is added as a typical dry charge during the conventional panning operation. Two coating syrups were used and were made by the following formulations and held at 167° F. (75° C.):

TABLE 10

| | Syrup A, Grams | Syrup B, Grams |
|---|---|---|
| Water | 680 | 920 |
| Maltitol | 3140 | 2936 |
| 35% Gum Talha solution | 1160 | 520 |
| Titanium Dioxide | 20 | 20 |
| Sweetener | 10 | 10 |
| Target Brix | 73 | 71 |

A 12 Kg charge of gum centers were coated in Driacoater DRC500/600 using the above coating syrups. Syrup A was applied in the first 12 coating applications followed by the application of maltitol powder after each syrup coat to assist dryness. Starting at coat 13 to about coat 30, syrup A applications were made without the use of powder maltitol. Flavor was added at coats 18, 19, 29 and 30. After all of the flavor was applied, syrup B was used to finish the coating in about 20 more coating applications. The 1.0 gram centers were coated to a finished piece weight of 1.52 grams and polished with carnauba wax and talc. Pellets are then evaluated for chipping by the bucket test or the zig-zag test after 24 hours, 48 hours, 72 hours, or 7 days after manufacture.

Several comparative samples were made by the standard coating compositions and process. Several coating tests were done with the HISS by replacing all or most of the gum talha. In one experimental formula (Example 1), all of the gum talha was replaced by HISS at a level of 9%. In another example (Example 2), an 8.8% level of HISS with 0.20% gum talha was used in a single syrup. Example 1 had a good quality appearance, whereas example 2 was sticky and had a poor quality appearance.

Chipping test results are shown in the following table comparing examples 1 and 2 against several comparative examples A1, A2, and A3 made on different days.

TABLE 11

| | Zip-zag method (Chips per 100 pellets) | | | |
|---|---|---|---|---|
| | 24 hours | 48 hours | 72 hours | 7 days |
| Example A1 | 120 | 120 | 132 | 137 |
| Example A2 | 97 | 127 | 133 | 150 |
| Example A3 | 129 | 149 | 121 | 180 |
| Example 1 | 3 | 3 | 9 | 19 |
| Example 2 | 40 | 33 | 47 | 42 |

These results suggested a significant improvement in reducing pellet chipping, so a scale-up test was done in a Driacoater DRC1200 charged with 60 Kg of gum centers. The coating test was done with 6% HISS (Example 3) with two thirds of the HISS in the first coating syrup and one third in the second coating syrup. A control sample was also prepared to compare test results (Example B) using 10.8% gum talha in the first coating syrup and 5.5% gum talha in the second syrup. Chip test results are show below:

TABLE 12

| | Bucket test | | | |
|---|---|---|---|---|
| | 24 hours | 48 hours | 72 hours | 14 day (Zig-zag) |
| Example B | 50 | 69 | 70 | 138 |
| Example 3 | 20 | 48 | 1 | 10 |

These data also show a significant reduction of the number of chipped pellets when HISS is used in the coating syrup compared to a gum talha (gum Arabic) material. Other tests with other various natural gums and starch derivatives were also tested, but gave only a slight improvement in pellet chipping. The HISS material showed a very significant improvement compared to other additives used in a maltitol coated product.

HISS may also be used as a binder in other sugarless coated chewing gum products or even other confectionery products and pharmaceutical products. The coating may use xylitol, erythritol, isomalt, maltitol or sorbitol. The coating may be a hard shell coating or a soft shell coating. For soft-shell coatings, higher levels of HISS may be used in addition to various hydrogenated starch hydrolysates (HSH). Soft-shell panning uses HSH along with a significant amount of dry charge to dry a coating. HISS may be used in addition to HSH in a coating or may replace some of the HSH in a soft coating.

For a hard shell coating where a gum Arabic binder is used, HISS may replace some or all of the gum Arabic binder to make a hard shell coating. In some instances, coatings with maltitol, isomalt, lactitol, or sorbitol may use a dry charge in the early stages of coating and finished with syrup only coatings. Some hard shell coating formulas using xylitol, erythritol, isomalt and sorbitol are shown below:

TABLE 13

| | Dry Weight, % | | | | | |
|---|---|---|---|---|---|---|
| | Example 4 | Example 5 | Example 6 | Example 7 | Example 8 | Example 9 |
| Xylitol | 94.8 | 92.4 | 90.7 | — | — | — |
| Erythritol | — | — | — | 90.1 | 87.9 | 86.8 |
| HISS | 4.0 | 6.0 | 7.0 | 8.5 | 10.5 | 12.0 |
| Flavor | 0.5 | 0.5 | 0.7 | 0.7 | 0.9 | 0.5 |
| Titanium Dioxide | 0.5 | 0.9 | 1.4* | 0.5 | 0.5** | 0.5** |
| Talc | 0.1 | 0.1 | 0.1 | 0.1 | 0.1 | 0.1 |
| Wax | 0.1 | 0.1 | 0.1 | 0.1 | 0.1 | 0.1 |

*Lake color dispersed in polyol solution used instead of titanium dioxide
**Calcium carbonate used in place of titanium dioxide The above formulas are used to coat pellets by applying a xylitol or an erythritol syrup containing xylitol or erythritol with HISS and titanium dioxide or color. Flavor is added at various times during the coating process. After pellets have been coated and dried, talc and wax are dusted onto the surface of the coated pellets to give an added polish to the pellets.

For coating formulas based on maltitol, lactitol, isomalt, and sorbitol, HISS can be used as a binder, film former, and a crystallization modifier to help facilitate coating. Generally, these polyols are more difficult to coat using only a straight syrup, but with proper technique a good smooth hard shell can be made. However, it may be preferable to add a dry charge to quicken the drying process before the pellets get too sticky. The following formulation may be used.

TABLE 14

| | Dry Weight, % | | | | | |
|---|---|---|---|---|---|---|
| | Example 10 | Example 11 | Example 12 | Example 13 | Example 14 | Example 15 |
| Sorbitol | 91.8 | 84.9 | 77.1 | — | — | — |
| Isomalt | — | — | — | 91.8 | 85.6 | 79.3 |
| Sorbitol Powder | 5.0 | 10.0 | 15.0 | — | — | — |
| Isomalt Powder | — | — | — | 5.0 | 10.0 | 15.0 |
| HISS | 2.0 | 4.0 | 6.0 | 2.0 | 3.0 | 4.0 |
| Flavor | 0.5 | 0.4 | 0.7 | 0.5 | 0.8 | 1.0 |
| Titanium Dioxide | 0.5 | 0.5 | 1.0 | 0.5 | 0.4 | 0.5 |
| Talc | 0.1 | 0.1 | 0.1 | 0.1 | 0.1 | 0.1 |
| Wax | 0.1 | 0.1 | 0.1 | 0.1 | 0.1 | 0.1 |

Sorbitol powder or isomalt powder is used to dry charge in the early stages of coating. Sorbitol or isomalt is blended with HISS and whitener into a syrup and applied to the pellets. Flavor is added at various times during the coating application After all of the coating is applied and dried, talc and wax are added to give a polish.

In addition to dry charging with the specific polyol, other ingredients may be added to the dry charge to help absorb moisture. These materials could be inert such as talc, calcium carbonate, starches, natural gums like gum talha or other moisture absorbing materials. Also, powdered sweeteners and flavors could be added with the dry charge.

Some polyols such as sorbitol, maltitol, lactitol, and isomalt are not sufficiently sweet compared to sugar or xylitol. For this reason high intensity sweeteners may be added to the coating such as aspartame, acesulfame K, salts of acesulfame, cyclamate and its salts, saccharin and its salts, alitame, sucralose, thaumatin, monellin, dihydrochalcone, glycyrrhizin, and combinations thereof. When a hot syrup is applied, heat may degrade the sweetener so only stable sweeteners should be used. Generally, high intensity sweeteners are added with the polyol/HISS solution to obtain an even distribution in the coatings.

Liquid flavors generally are not added throughout the coating but at specific points throughout the process. When a flavor is added, less air is used for drying until the flavor coating is covered by the next coatings and dried. Flavors may be various spearmint, peppermint, wintergreen, cinnamon, and fruit flavors to yield a wide variety of flavored chewing gum products.

It should be appreciated that the compositions and methods of the present invention are capable of being incorporated in the form of a variety of embodiments, only a few of which have been illustrated and described above. The invention may be embodied in other forms without departing from its spirit and essential characteristics. The described embodiments are to be considered in all respects only as illustrative and not restrictive, and the scope of the invention, therefore, indicated by the appended claims rather than by the foregoing description. All changes that come within the meaning and range of equivalency of the claims are to be embraced within their scope.

What is claimed:

1. A coated food product wherein the product is coated with a coating composition comprising hydrogenated indigestible starch syrup as a binding agent and the coated food product is selected from the group consisting of foods other than chewing gum.

2. The coated product of claim 1, wherein the coating composition further comprises a bulking agent.

3. The coated product of claim 1 or 2, wherein the hydrogenated indigestible starch syrup is obtained by a process comprising: hydrolyzing pyrodextrin with a combination of alpha-amylase and debranching enzyme by dual stage hydrolysis to obtain an indigestible starch syrup, and hydrogenating said syrup.

4. The coated product of claim 1 or 2, wherein the hydrogenated indigestible starch syrup contains dietary fiber in an amount of 30 to 60%.

5. The coated product of claim 1 or 2, wherein the coating is sugarless coating.

* * * * *

UNITED STATES PATENT AND TRADEMARK OFFICE
CERTIFICATE OF CORRECTION

PATENT NO. : 7,504,122 B2
APPLICATION NO. : 11/048879
DATED : March 17, 2009
INVENTOR(S) : Julius W. Zuehlke et al.

It is certified that error appears in the above-identified patent and that said Letters Patent is hereby corrected as shown below:

On the title page under the item (*) Notice:, the following should be added after "Subject to any disclaimer, the term of this patent is extended or adjusted under 35 U.S.C. 154(b) by 949 days."

--This patent is subject to a terminal disclaimer.--

Signed and Sealed this

Twenty-fourth Day of November, 2009

David J. Kappos
*Director of the United States Patent and Trademark Office*